United States Patent
Stoy et al.

[11] 3,894,578
[45] July 15, 1975

[54] METHOD OF AND APPARATUS FOR CONDENSING VAPORS OF NON-POLAR LIQUIDS

[75] Inventors: Vladimir Stoy; Miroslav Stol; Artur Stoy, all of Prague, Czechoslovakia

[73] Assignee: Ceskoslovenska akademie ved, Prague, Czechoslovakia

[22] Filed: Mar. 29, 1973

[21] Appl. No.: 345,995

[30] Foreign Application Priority Data
Mar. 30, 1972 Czechoslovakia ............... 2140-72

[52] U.S. Cl. .................. 165/1; 117/97; 165/133
[51] Int. Cl. ............................................. F28f 5/00
[58] Field of Search ............... 165/1, 133; 117/97

[56] References Cited
UNITED STATES PATENTS

| | | | |
|---|---|---|---|
| 2,923,640 | 2/1960 | Buckingham | 165/133 |
| 3,307,996 | 3/1967 | Keneipp | 117/97 |
| 3,347,699 | 10/1967 | Hitzman | 117/97 |
| 3,347,700 | 10/1967 | Gloyer et al. | 117/97 |
| 3,355,315 | 11/1967 | Jorda et al. | 117/97 |
| 3,717,495 | 2/1973 | Paoletti | 117/97 |

*Primary Examiner*—Manuel A. Antonakas
*Assistant Examiner*—Daniel J. O'Connor

[57] ABSTRACT

Method of and apparatus for condensing vapors of non-polar liquids by condensing them on a cooled surface provided with a thin layer of a polymer compound containing polar side groups.

5 Claims, 1 Drawing Figure

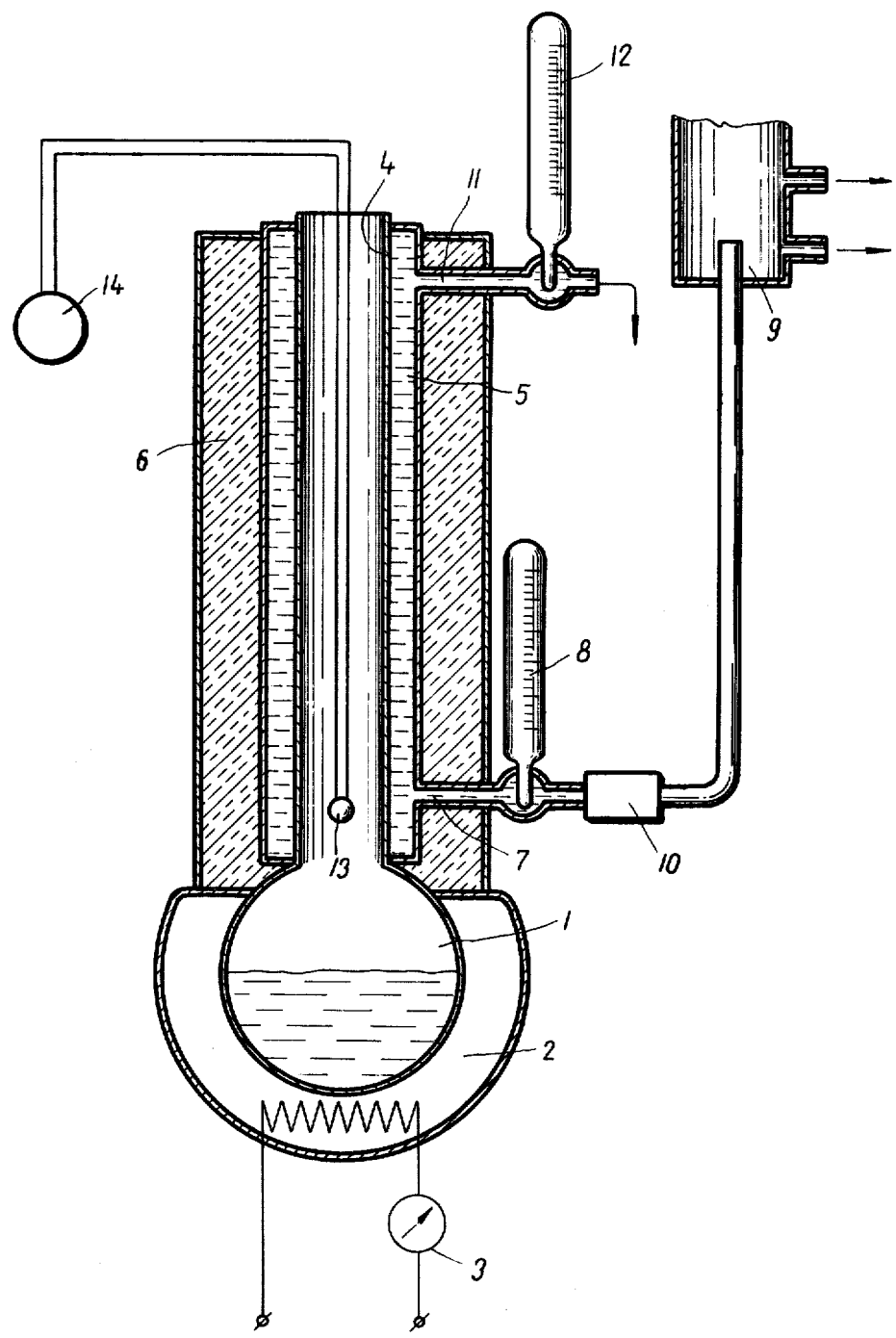

METHOD OF AND APPARATUS FOR CONDENSING VAPORS OF NON-POLAR LIQUIDS

BACKGROUND OF THE INVENTION

At the present time huge quantities of various non-polar liquids are distilled, such distilled liquids being used especially in the propellant and chemical industries, and in industries processing oils, coal-tar, etc. Among such non-polar organic compounds are aliphatic, hydroaromatic, and aromatic hydrocarbons, olefines, halogenated hydrocargons, ethers, and similar compounds.

The efficiency of a distillation apparatus is limited, as a rule, by the efficiency of the condenser employed, i.e. by the value of the heat transfer coefficient between the wall of the condenser and the stream of condensing vapors, assuming of course that the other parameters of the condenser, such as the condensation area, the temperature and rates of flow of the vapors and the cooling medium remain the same. It is well known that such efficiency of the condenser or condensation efficiency depends largely on the manner of condensation. The heat transfer coefficient is much higher as a rule (for example 4 to 8 times) with dropwise condensation than with film condensation. In film condensation the condensation surface is covered with a continues downwardly traveling film of the condensed liquid. The streamline flow of such film causes the heat transfer to be controlled by the conduction of heat across the laminar flow in the film, and is therefore much less than that occurring in dropwise condensation. In dropwise condensation convection occurs inside each drop rolling down along the heat transfer wall, and there is also direct contact between the vapor and the exposed surface of the wall of the condenser.

The mode of condensation depends on many variable factors. One of these is the intensity of the condensation, i.e. the amount of vapor condensed on a unit of surface area of a condensation surface per unit of time. Other factors are surface tension of the condensed liquid, interfacial tension between the liquid and the condensation surface, and the mode of flowing of the stream of the vapor, i.e. its Reynolds number. In practice, both dropwise condensation and film condensation coexist, but either one or the other prevails depending upon the above mentioned factors. The ratio of the dropwise to the film condensation grows less as the intensity of the condensation and the Reynolds number of the stream of the vapors increase. Thus, the efficiency of a given condenser decreases as its output increases. It follows therefore that when there is a lesser dependency of the efficiency of the condenser upon its output the condensation area of the condenser can be utilized with better efficiency, and the higher will be the capacity of the condenser.

A method of increasing the capacity of steam condensers is well known. This method consists in coating the condensation surfaces, which are preferably polished, with a very thin layer of a hydrophobic compound, e.g. benzyl mercaptane, silicone oil or octyl thiocyanamide, which decreases the wettability of the surface by water.

If a non-planar compound is condensed, the problem of maintaining the ratio of dropwise condensation to film condensation is even more important than in the case of steam condensation because of the low heat conductivity of non-polar liquids. Unfortunately, however, a permanent effect can not be achieved in condensing non-polar compounds by coating the condensation surfaces with a polar compound having a consistency similar to those used for steam condensation, e.g., glycerol, glycoles, various sugars, low-molecular acids or bases, etc. The most probable reason for this is that the distilled non-polar liquid usually contains some trace of water or other polar compound which condenses together with such non-polar one, the polar compound being selectively absorbed in the coating on the condenser wall. As a result, such coating is soon or later washed down and disappears from the condenser wall.

The present inventors have now found that the efficiency of condensation of vapors of non-polar organic liquids such as aliphatic, hydroaromatic, or aromatic hydrocarbons, olefines, halogenated aliphatic hydrocarbons, halogenated or hydrogenated aromatic hydrocarbons, ethers, etc., or their mixtures, can be permanently enhanced by carrying out the condensation on a satisfactorily heat-conductive wall, such as one made out of metal, which is cooled and has been coated with a film thinner than 0.1 mm of a polymer containing polar side groups. Said polymer compound has an average molecular weight more than 10,000 and contains at least one kind of a side group selected from a group consisting of $-OX$, $-CO.O^-X^+$, $-O.SO_2.O^-X^+$, $-SO_3^-X^+$, $-CN$, $-NH.CO.NHR$, $-O.CO.NHR$, $-NH.CO.NR.NHR$, $-CO.NH.OH$, $-O.CO.NR.CO.NHR$, $-NR_1R_2$, $-NRR_1R_2^+Y^-$, $-CO.NR_1R_2$, pyridyl, quarternized pyridyl or pyrrolidyl (where X is hydrogen, alkali metal or quarternized amine, R, $R_1$ and $R_2$ are hydrogen atoms, alkyls or substituted alkyls, which may be the same or different each from other, Y is an OH-group or an anion of a strong acid, e.g. $F^-$, $Cl^-$, $Br^-$, $SO_4H^-$ or $RSO_3^-$).

We have also found that we can carried out the method of the invention by incorporating into the polymer film a compound having a molecular weight less than 10,000 and either containing some of the above-listed polar side groups, or being an organic or inorganic acid, base or salt, e.g. organic or inorganic phosphate, carbonate, sulphate, chloride, or nitrate.

The condensation surface can be coated with such polymer layer in various ways. It can be coated with the polymer or copolymer having an average molecular weight more than 10,000 and already containing some of the above mentioned strongly polar side groups before the coating operation, or it can be coated with a polymer or copolymer in a first step, while some of the polar-groups can be introduced into the polymer coating by proper chemical reaction in a second step. Another method which may be used is to form the polymer film in situ on the condensation surface by a polyreaction of polyfunctional compounds having a molecular weight less than 10,000.

Similarly, the low-molecular compound of the coating, the presence of which is often advantageous but is not necessary, may be introduced together with the polymer, or may be introduced into the film after the polymer coating is formed.

The polymer film may be subsequently cross-linked on the condensation surface by suitable reaction, for instance by that of amino groups, hydroxy groups, or carboxylic groups with each other, or with polyisocyanates, aldehydes, or similar compounds. Non-cross linked polymers or copolymers can also be used, preferably those which are water-swellable but insoluble in water. Examples of such polymers are polyethyleneglycol monomethacrylate, poly-ethyleneglycol monoacrylate, partially hydrolyzed polyarcylonitrile, particularly hydrolized polyacrylonitrile, partially hydrolyzed polyvinylacetate, copolymers of acrylonitrile with vinylsulfonic acid and the respective salts, regenerated cellulose, carboxymethyl cellulose, and many others.

The condensation surface can be advantageously coated with a thin layer of a polymer, the layer being subsequently superficially hydrophilized, e.g. by partial hydrolysis, sulphonation, sulphochlorination, etc. In this way layers made for example of cellulose esters, polyalkylmethacrylate, poly-glycol methacrylate, polyacrylnitrile, or methyl methacrylate - maleinanhydride interpolymer can be treated. This complementary hydrophilization provides the coating with a very polar surface, while its core, especially the polymer near to the film-wall of the condenser interface, is left intact. The water-swellability of the film decreases gradually in a direction away from the surface, so that an interfacial tension, caused by swelling of the traces of polar compounds in the distilled liquid, does not occur in the interface alone, but is spread out along all the thickness of the film, so that better adhesion to the wall is achieved. Of course, such adhesion can also be enhanced in other ways, e.g. by incorporating some epoxy-groups into the polymer.

One would assume that the gain of efficiency of condensation owing to the unwettability of the condensation surface would be to a large extent compensated by decreased heat-conductivity of the wall of the condenser. Surprisingly enough, however, the desirable effect takes place even if the polymer film is as thin as 0.1 mm or less. Of course, the thinner the polymer film, the greater is the gain of the condenser efficiency, so that it is desirable to form a coating as thin as possible. The thickness of the coating depends mainly on the method by which it was formed. For instance, the wall of the condenser can be wetted with a properly diluted polymer solution, the solvent being removed, i.e. evaporated or washed off, under conditions which ensure the forming of the polymer film as homogeneous and thin as possible. A cylindrical condensation wall can be treated in this way by being simultaneously rotated around its longitudinal axis.

Other methods providing a very thin homogeneous coating are:
1. Spraying the diluted polymer solution onto the condensation surface, which is advantageously preheated to a desired predetermined temperature depending upon the boiling point of the solvent used.
2. Electrostatic spraying consisting in charging the surface to be coated and the coating agent to opposite potentials.
3. Polymerizing vapors of a suitable monomer so that they impinge on the wall of a condenser which has been pre-heated to a predetermined desired temperature.

The invention will be more readily understood by consideration of the accompanying drawing, in which;
The single FIGURE of the drawing is a schematic view, partially in vertical cross-section, of apparatus for determining the heat transfer coefficient of a condenser.

A heater 1, filled up to half of its volume with a tested liquid, is equipped with the electric heating jacket 2 with a constant heat input controlled by rheostat 3. The constant heat input secures a constant flow of vapors into the condenser after a steady-state is reached. The neck of the heater is connected with a vertical circular cylindrical condenser, consisting of a steel tube 4 and a cooling jacket 5. Both condenser and the part of the heater above the heating jacket are equipped with the heat insulation 6. There is an inlet for cooling medium on the lower end of the cooling jacket of the condenser. The temperature of cooling water flowing into the cooler is measured by a thermometer 8. Constant rate of flow of cooling water is secured by an overflow 9, and it is checked by a flow indicator 10. The cooling water leaves the cooling jacket through an outlet 11. Its temperature $t_2$ is measured by a thermometer 12.

In the course of the experiment, the vapor rises into the condenser, condenses, and the condensate flows down along the wall of the condenser back into the heater. Under steady-state conditions there a are constant volume of the liquid in the heater and a time-constant flow of the vapor through the condenser. The height of the active condensation zone (i.e. the level of the condensing vapor of the boiling liquid) is measured by a probe 13, which is a thermocouple connected with a temperature indicator 14.

After a stable boiling and all other parameters have been achieved, the probe is dropped slowly down in the center of the condenser. While the probe is in the upper zone of the condenser, the temperature, shown by the indicator, does not depend on the position of the probe. On the other hand, if the level of vapor was reached, temperature rises abruptly to the boiling point of the tested liquid. The height of the active condensation zone, taken from the lower edge of the cooling jacket to the level of the vapor, (and, thus, also the condensation area) is calculated from the position of the probe. The overall heat transfer coefficient is calculated from the expression $$K = \frac{G \, / \, t_1 - t_2 \, /}{\Delta t \, \Pi \, \phi \, h}$$

where
G is the rate of flow of the cooling water in kg per hour;
$t_1$ is the temperature of the cooling water, measured in the inlet of the cooling jacket;
$t_2$ is the temperature of the cooling water leaving the cooling jacket;
$\Delta t$ is the mean difference of temperature of condensing liquid and the cooling water (in °Centrigrades).
$t$ is given by the expression $$\Delta t = t_p - / \, \frac{t_1 + t_2}{2} \, /,$$

where $t_p$ is the temperature shown by the thermocouple, i.e. boiling point of the tested liquid.
$\phi$ is the inner diameter of the condenser; and
$h$ is the height of the active condensation zone from the foot of the cooling jacket to the level of vapor, measured by the probe.

The K-value was determined for the untreated condenser in the same way as K-value for the same condenser with its condensation surface coated with a tested polymer. The ratio K/K − X is considered as a criterion of the efficiency of the tested layer. Both K and K' depend also on the rate of flow of the cooling water, because K' and K express overall transfer coefficients, i.e. through both vapor-wall and wall-cooling medium interfaces. Thus, it is necessary to determine both K and K' at the same and constant rate of flow of the cooling water. All further K and k' values were determined at $G = 0.1$ m$^3$ per hour.

EXAMPLE 1

The inner surface of the above-described condenser was coated with a thin layer of non-crosslinked polyglycol monomethacrylate. This polymer was prepared by polymerizing 10% by weight solution of glycol monomethacrylate containing 0.23% dimethacrylate and 0.1 per cent benzoyl peroxide in methanol at the boiling point of the mixture. The coating was carried out in the following way:

The tube 4 of the apparatus of the drawing was sealed on both its ends with two perforated rubber stoppers (the diameter of their apertures was 20 mm), and rotated at 6 r.p.m. around its longitudinal axis in horizontal position. During the rotation a 3% solution of polyglycol monomethacrylate in methanol was added gradually into the tube, the solvent being allowed to evaporate until the polymer film formed on the condenser was 0.05 – 0.07 mm thick (this value was calculated assuming the polymer is spread on the whole surface uniformly). The apparatus was filled with n-hexane and operated as above described. It was found that the X-value was 1.23.

EXAMPLE 2

Gaseous SO$_3$ was blown through the described condenser, treated according to the Example 1, for one minute at 23°C. It was found that $X = 1.68$ with the apparatus filled with n-hexane.

EXAMPLE 3

Non-crosslinked poly-glycol metacrylate, having an average molecular weight of 230.000, was prepared according to the Example 1.3 parts by weight (W.P.) of the polymer, 30 w.p. of methylene chloride and 67 w.p. of methanol were mixed, and the resulting solution was put into a pressure vessel, equipped with a spray nozzle, together with 50 w.p. of Freon 12. The condenser was pre-heated to 35°C, and the polymer solution was gradually sprayed into it as slowly as it was necessary for evaporating the solvents completely. A polymer film 0.01 – 0.02 mm thick was formed, the thickness being calculated from the weight loss of the vessel, assuming the polymer has been spread uniformly. The X-value was found to be 1.85 with n-hexane as the testing liquid.

EXAMPLE 4

The condenser of the Example 3 was further treated by blowing gaseous SO$_3$ for 30 seconds at 20°C through it. The condenser treated in this way gave an X-value 3.2 for n-hexane.

EXAMPLE 5

The condenser according to the Example 3 was further treated by immersing it into 2% aqueous solution of formaldehyde, (the pH value being set up to 3 by adding HCl) for 1 hour. The condenser with the swelled coating was heated to 85°C, and, consequently, the polymer film became insoluble. The condenser provided an X-value = 1.8 with n-hexane.

EXAMPLE 6

A copolymer, consisting of 90 mol.% glycol monometacrylate and 10 mol.% metacrylic acid, was prepared by polymerizing the 10% methanolic solution of the monomer mixture at its boiling point. The polymerization was initiated with 0.2% of benzoyl peroxide.

Further, a solution consisting of 3% of the copolymer, 1% of glycol monoacrylate monomer (containing 1.5% of glycol diacrylate and 0.5% benzoyl peroxide), 30% of methylene chloride and 66% of methanol was prepared. The solution was sprayed on the condenser surface in a manner similar to that described in the Example 3 until the calculated thickness of the film reached 0.01 – 0.02 mm. After the polymer dried, it was cross-linked by heating to 85°C for one hour. Then the polymer film was soaked with a 1% aqueous solution of sodium hydroxide for 5 minutes, an excess of the solution was wiped off, and the heat transfer coefficient was determined on the above-described apparatus with its heater being filled with n-hexane. It was found that $X = 2.9$.

EXAMPLE 7

N-hexane in the Example 6 was replaced with benzene. X was then found to equal 2.0.

EXAMPLE 8

The measurement according to the Example 6 was repeated with diethyl ether instead of n-hexane. In this case X was found to be 1.15.

EXAMPLE 9

The condenser, treated according to Example 3, was dipped into a 2:1 glycerol-water mixture for one hour. The excess of the liquid was wiped off the condensation surface, and the condenser was used for the determination of the heat transfer coefficient, using a petroleum fraction boiling at 65° –69°C as the testing liquid. X-value was found to be 2.0.

EXAMPLE 10

8.5 parts of 67% nitric acid, 1.5 weight parts of acrylonitrile, 0.01 weight parts of urea and 0.01 weight part of ammonium persulphate were mixed together and superimposed with a thin layer of white oil. After 135 hours at 20°C a viscous solution of the copolymer, containing 27 mol.% of acrylonitrile, 71 mol.% of acryl amide and 2 mol.% of acrylic acid, was obtained. A thin layer of this solution was spread on the inner surface of a steel tube having inner diameter 30 mm, the thickness of the wall 0.5 mm and the length 500 mm. The tube with the layer of the solution was dipped into cold water at 7°C for two minutes, so that the copolymer in the solution coagulated on the wall, forming a thin, uniform film there. Then the tube was filled with 1% formaldehyde solution for 10 minutes, emptied again, and heated one hour at 90°C. As a result, the polymer film became insoluble. The polymer layer was then swelled with 10% aqueous solution of KNO$_3$ for 24 hours, after that the excess of the solution was wiped off the surface and the tube was used as the tube 4 in the above-described condenser. A benzine, having distillation range 85° – 90°C, was used as the testing liquid; the X-value was found to be 1.90.

EXAMPLE 11

1 weight part of polyvinylpyridine having average molecular weight $\overline{M}_w = 12,000$, 1 weight part of ethyl bromide and 18 weight parts of ethylene carbonate were heated in the sealed tube at 75°C for 10 hours. The polymer solution thus obtained was used for the treatment of the copper tube 4 of the above-described and illustrated condenser in the same way that was described in Example 1. Temperature was maintained at 50°C during the evaporation of the solvent. The resulting thickness of the polymer film, still containing about 10% by weight of ethylene carbonate, was 0.02–0.03 mm. The heat transfer coefficient was determined by using light petrol (boiling range 73° – 78°C) as the testing liquid, and it was found to be X = 1.75.

EXAMPLE 12

The stainless steel tube, described in Example 10, was pre-heated to 175°C. A stream of nitrogen at a rate of 20 ml per minute was bubbled through warm metacrylic acid (50°C) and then let into the tube. 1.7 g of metacrylic acid evaporated during 1 hour, and some part of this amount polymerized on the inner surface of the tube. The inner surface was then shortly wetted with 1% sodium bicarbonate solution. The X-value was found to be 3.25 when using n-hexane as the testing liquid.

EXAMPLE 13

57.5 weight parts of 47% aqueous solution of sodium ethylene sulphonate, 7.1 weight parts of acrylonitrile, 76 weight parts of distilled water, 1 weight part of 5% aqueous solution of sodium pyrosulphite, and 1 weight part of 5% aqueous solution of ammonium persulphate were mixed together, and stored for 24 hors under protective carbon dioxide atmosphere at ambient temperature. The viscous solution thus obtained was precipitated in 2,000 parts of ethyl alcohol. The precipitated copolymer was dried at 70°C, and dissolved in water to form a 3% solution. The solution was used for the treatment of a condenser similar to that described in the Example 1. The rotating tube was heated by a stream of hot air to hasten the evaporation of water. There was added an amount of the solution corresponding to the thickness of a dry film 0.04 – 0.05 mm thick on the condenser wall. Then the tube was filled with 37% aqueous formaldehyde solution, which was acidified with 0.2% HCl, for two hours. After that the tube was dipped into water, and, finally into a 2% solution of $NaHCO_3$. Testing with n-hexane provided an X-value = 2.65.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. A method of condensing vapors of non-polar organic liquids from the group consisting of aliphatic, hydroaromatic, and aromatic hydrocarbons, olefines, halogenated hydrocarbons and others, comprising carrying out the condensation on a cooled condensing surface coated with a film thinner than 0.1 mm, the said film consisting essentially of a polymer compound having an average molecular weight more than 10.000 and containing polar side groups selected from the group consisting of
—OX, —CO.O⁻X⁺, —S.SO₂.O⁻X⁺, —SO₃⁻X⁺, —CN, —NH.CO.NHR, —O.CO.NHR, —NH.CO.NR.CO.NHR, —CO.NH.OH, —O.CO.NR.CO. NHR, —NR₂R₂, —NRR₂⁺Y—, —CO.NR₁R₂, pyridyl, quarternized pyridyl and pyrrolidyl, where X is hydrogen, alkali metal or quarternized amine, R, R₁ and R₂ are hydrogen atoms, alkyls or substituted alkyls, which may be the same or different each from other, and Y is an OH-group or an anion of a strong acid, e.g. F⁻, Cl⁻, Br⁻, $SO_4H^-$ or $RSO_3^-$.

2. A method of condensing vapors of non-polar organic liquids from the group consisting of aliphatic, hydroaromatic, and aromatic hydrocarbons, olefines, halogenated hydrocarbons and others, comprising carrying out the condensation on a cooled condensing surface coated with a film thinner than 0.1 mm, the said film consisting essentially of a polymer compound having an average molecular weight more than 10.000 and containing polar side groups selected from the group consisting of —OX, —CO.O⁻X⁺, —S.SO₂.O⁻X⁺, —CN, —NH.CO.NHR, —O.CO.NHR, —NH.CO.NR.CO.NHR, —CO.NH.OH, —O.CO.NR.CO. NHR, —NR₁R₂, —NRR₁R₂⁺Y⁻, —CO.NR₁R₂, pyridyl, quarternized pyridyl and pyrrolidyl, where X is hydrogen, alkali metal or quarternized amine, R, R₁ and R₂ are hydrogen atoms, alkyls or substituted alkyls, which may be the same or different each from other, and Y is an OH-group or an anion of a strong acid, e.g. F⁻, Cl⁻, Br⁻, $SO_4H^-$ or $RSO_3^-$, the said film being initially coated upon said condensing surface as at least one of a group consisting of an essentially non-polar polymer, an essentially non-polar copolymer, and a slightly polar copolymer and comprising subsequently introducing strongly polar groups into the polymer of the coating by a polymer-analogous reaction, introducing in the polymer an ionizable group chosen from at least one of the groups —CO.O⁻X⁺, —O.SO₂O⁻X⁺, —SO₃⁻X⁺, —NRR₁R₂⁺Y⁻ or quarternized pyridyl.

3. A method as set forth in claim 2, wherein the said polymer is formed in situ on the condensing surface by a polyreaction of polyfunctional compounds having molecular a weight less than 10,000.

4. A method of condensing vapors of non-polar organic liquids from the group consisting of aliphatic, hydroaromatic, and aromatic hydrocarbons, olefines, halogenated hydrocarbons and others, comprising carrying out the condensation on a cooled condensing surface coated with a film thinner than 0.1 mm, the said film consisting essentially of a polymer compound having an average molecular weight more than 10.000 and containing polar side groups selected from the group consisting of
—OX, —CO.O⁻X⁺, —S.SO₂.O⁻X⁺, —SO₃⁻X⁺, —CN, —NH.CO.NHR, NHR, —NR₁R₂, —NRR₁R₂⁺Y⁻, —CO.NR₁R₂, pyridyl,
and introducing a compound into the said film in the period including before and during the condensation, said compound being chosen from a group consisting of compounds containing polar side groups, organic acids, bases and salts, and inorganic acids, bases, and salts.

5. A method as set forth in claim 4, wherein the said side groups are selected from the group consisting of —OX, —CO.O⁻X⁺, —O.SO₂.O⁻X⁺, —SO₃⁻X⁺, —CN, —NH.CO.NHR, —O.CO.NHR, —NH.CO.NR.CO.NHR, —CO.NH.OH, —O.CO.NR.CO.NHR, —NR₁R₂, —NRR₁R₂⁻Y⁺, —CO.NR₁R₂, pyridyl, quarternized pyridyl and pyrrolidyl where X is hydrogen, alkali metal or quarternized amine, R, R₁ and R₂ are hydrogen atoms, alkyl or substituted alkyls, which may be the same or different each from other, and Y is an OH-group or an anion of a strong acid, e.g. F⁻, Cl⁻, Br⁻, SO₄H⁻ or RSO₃⁻.

* * * * *